US009806807B1

(12) United States Patent
Sandstrom et al.

(10) Patent No.: US 9,806,807 B1
(45) Date of Patent: Oct. 31, 2017

(54) AUTOMATIC ROGUE ONU DETECTION

(71) Applicant: Adtran, Inc.

(72) Inventors: Leif Sandstrom, Madison, AL (US); Daniel M. Joffe, Owens Crossroads, AL (US); John G. Brooks, Madison, AL (US); George Bekken, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 15/207,787

(22) Filed: Jul. 12, 2016

(51) Int. Cl.
*H04B 10/00* (2013.01)
*H04B 10/079* (2013.01)
*H04B 10/27* (2013.01)
*H04B 10/25* (2013.01)

(52) U.S. Cl.
CPC ....... *H04B 10/07955* (2013.01); *H04B 10/25* (2013.01); *H04B 10/27* (2013.01)

(58) Field of Classification Search
CPC ... H04B 10/07955; H04B 10/27; H04B 10/25
See application file for complete search history.

(56) References Cited

U.S. PATENT DOCUMENTS

| 8,965,209 | B2* | 2/2015 | Goodson | H04Q 11/0067 |
| | | | | 398/33 |
| 9,473,241 | B1* | 10/2016 | Joffe | H04B 10/27 |
| 9,537,573 | B2* | 1/2017 | Goodson | H04Q 11/0067 |
| 2004/0033004 | A1* | 2/2004 | Welch | B82Y 20/00 |
| | | | | 385/14 |
| 2006/0147219 | A1* | 7/2006 | Yoshino | H04B 10/548 |
| | | | | 398/183 |
| 2006/0165139 | A1* | 7/2006 | Sanchez | H01S 5/06832 |
| | | | | 372/29.021 |
| 2006/0198635 | A1* | 9/2006 | Emery | H04B 10/0799 |
| | | | | 398/38 |
| 2007/0165688 | A1* | 7/2007 | Lee | H04B 10/2587 |
| | | | | 372/71 |
| 2007/0237523 | A1* | 10/2007 | Miguel | H04J 3/14 |
| | | | | 398/71 |
| 2008/0187314 | A1* | 8/2008 | Chung | H04B 10/2587 |
| | | | | 398/72 |
| 2009/0110397 | A1* | 4/2009 | Yeh | H04J 3/1694 |
| | | | | 398/52 |

(Continued)

FOREIGN PATENT DOCUMENTS

EP 1906563 B1 4/2011

*Primary Examiner* — Danny Leung
(74) *Attorney, Agent, or Firm* — Fish & Richardson P.C.

(57) ABSTRACT

Methods, systems, and apparatus for automatically identifying rogue Optical Network Unit (ONU) are disclosed. In one aspect, an Optical Line Terminal (OLT) determines dark power on a fiber optic link over a period of time. For a given ONU, the OLT determines an optical power of high signals and an optical power of low signals received over the fiber optic link during a timeslot assigned to the given ONU, determines a modified optical power of the high signals and a modified optical power of the low signals based on differences between the optical power of the respective signals and the dark power, determines an extinction ratio based on a ratio of the modified optical power of the high signals relative to the modified optical power of the low signals, and identifies the given ONU as a rogue ONU when the extinction ratio is outside of a specified range.

21 Claims, 4 Drawing Sheets

(56) References Cited

U.S. PATENT DOCUMENTS

| | | | |
|---|---|---|---|
| 2009/0214222 A1* | 8/2009 | Grossman | H04B 10/032 398/173 |
| 2009/0238564 A1* | 9/2009 | Rohde | H04B 10/077 398/45 |
| 2009/0239564 A1 | 9/2009 | Malladi et al. | |
| 2012/0099857 A1* | 4/2012 | Zhang | H04B 10/69 398/38 |
| 2012/0128359 A1* | 5/2012 | Mazzone | H04B 10/2587 398/67 |
| 2013/0011142 A1* | 1/2013 | Goodson | H04Q 11/0067 398/98 |
| 2014/0029635 A1* | 1/2014 | Biegert | H01S 3/02 372/38.04 |
| 2015/0125151 A1* | 5/2015 | Goodson | H04Q 11/0067 398/72 |

\* cited by examiner

AUTOMATIC ROGUE ONU DETECTION

BACKGROUND

This specification relates to rogue Optical Networking Unit (ONU) detection.

In a Passive Optical Network (PON), an ONU may malfunction and transmit outside of its assigned timeslot (or timeslots). Such a malfunctioning ONU (e.g., a rogue ONU) can interfere with upstream transmissions of other ONUs on the PON, and may cause the entire PON to go offline.

SUMMARY

In general, one innovative aspect of the subject matter described in this specification can be embodied in methods for automatically identifying a rogue Optical Networking Unit (ONU). One example computer-implemented method includes determining dark power on a fiber optic link over a period of time, and for a given ONU connected to the fiber optic link the following operations are performed: determining an optical power of high signals and an optical power of low signals received over the fiber optic link during a timeslot assigned to the given ONU, determining a modified optical power of the high signals based on a difference between the optical power of the high signals and the dark power, determining a modified optical power of the low signals based on a difference between the optical power of the low signals and the dark power, determining an extinction ratio based on a ratio of the modified optical power of the high signals relative to the modified optical power of the low signals, and identifying the given ONU as a rogue ONU when the extinction ratio is outside of a specified range.

These and other embodiments can each, optionally, include one or more of the following features. The optical power of the high signals is determined by measuring on the fiber optic link while the given ONU is transmitting all high signals (e.g., all logical 1s) during the timeslot, and the optical power of the low signals is determined by measuring on the fiber optic link while the given ONU is transmitting all low signals (e.g., all logical 0s) during the timeslot. Determining the optical power of the high signals and the optical power of the low signals, determining the modified optical power of the high signals and the modified optical power of the low signals, determining the extinction ratio, and identifying the given ONU as the rogue ONU are performed automatically by an Optical Line Terminal (OLT) connected to the fiber optic link. The OLT and the given ONU are on a Gigabit Passive Optical Network (GPON). For the given ONU, the OLT identifies the given ONU as a non-rogue ONU when the extinction ratio is within the specified range.

Methods can further include for the given ONU, determining average optical power of signals received during the timeslot assigned to the given ONU, determining a power difference between optical power of high signals and optical power of low signals, determining state densities of data received from the given ONU during the timeslot assigned to the given ONU, the state densities including a high signal density and a low signal density, determining the optical power of the high signals based on a sum of the average optical power of signals and a product of the power difference and the low signal density, and determining the optical power of the low signals based on a difference between the average optical power of signals and a product of the power difference and the high signal density. The power difference can be determined based on an AC-coupled Received Signal Strength Indicator (RSSI) measurement, and the average optical power of signals can be determined based on a DC-coupled RSSI measurement.

Particular embodiments of the subject matter described in this specification can be implemented so as to realize one or more of the following advantages. OLT hardware and/or software can include a rogue monitor that automatically detects and/or identifies rogue ONUs without manual intervention. No modification to ONU hardware and/or software is needed, such that the methods, devices and systems described in the present disclosure can work with currently deployed ONUs without requiring ONU upgrades. In addition, the methods, devices, and systems described in the present disclosure implement an automated rogue ONU detection and identification technique that can reliably and rapidly detect and identify a rogue ONU on a Passive Optical Network (PON). ONU power-cycling during troubleshooting for rogue ONU can be avoided by implementing the methods, devices, and/or systems described herein to identify rogue ONUs.

While some aspects of this disclosure generally describe computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The present disclosure describes methods, systems, and apparatus for automatically detecting and/or identifying a rogue Optical Networking Unit (ONU) without requiring ONU upgrades. For example, an Optical Line Terminal (OLT) can identify a given ONU as a rogue ONU when a calculated extinction ratio (ER) for the given ONU is outside of a specified range (e.g., normal range of ER values). Although this disclosure refers to optical telecommunications systems for purposes of example, the subject matter of this document can be applied to other types of telecommunications systems or other systems that transmit digital data.

A Passive Optical Network (PON), such as a Gigabit Passive Optical Network (GPON), is a one-to-many network. For example, a single OLT at a Central Office is connected to multiple ONUs at customer premises in a PON. To serve the multiple customers, the PON uses logical multiplexing in a downstream direction and time-division multiplexing in an upstream direction. When an ONU malfunctions and transmits outside of its assigned timeslots, the malfunctioning ONU (referred to as a rogue ONU) can interfere with upstream transmissions of other ONUs on the PON. In some cases, a rogue ONU may not respond to commands from the OLT to, for example, stop transmission and/or turn off its transmitter. As a result, rogue detection, identification, and/or mitigation can become a time-consuming and manual process that requires manual power cycling of each ONU on the PON to find the rogue ONU. In some cases, the entire PON is taken offline in order to identify the rogue ONU.

The disclosed subject matter addresses problems that arise when an ONU becomes a rogue ONU. For example, when a rogue ONU fails to disable its transmitter outside of timeslots that are assigned to that ONU, the rogue ONU may unintentionally (or intentionally) inject an optical signal onto a PON outside of timeslots that have been assigned to the rogue ONU. When the rogue ONU transmits outside of its assigned timeslots, these transmissions can negatively affect performance of other ONUs on the PON whose signal powers are, for example, not more than 10 dB higher than the rogue's injected signal power.

In the present disclosure, an OLT with a rogue monitor can monitor, measure, acquire, and/or calculate communication parameters on a fiber optic link for any given ONU connected to the fiber optic link. Based on the communication parameters, the OLT can calculate an ER for the given ONU, and can identify the given ONU as a rogue ONU when the calculated ER for the given ONU is outside of a specified range according to a rogue detection and identification (RDI) technique described in detail below. Using the techniques discussed in this document, rogue ONU(s) can be detected and identified on currently deployed PONs without requiring ONU upgrades at customer premises. Any telecommunications systems with rogue devices may benefit from the subject matter described in this document.

Figure 1:
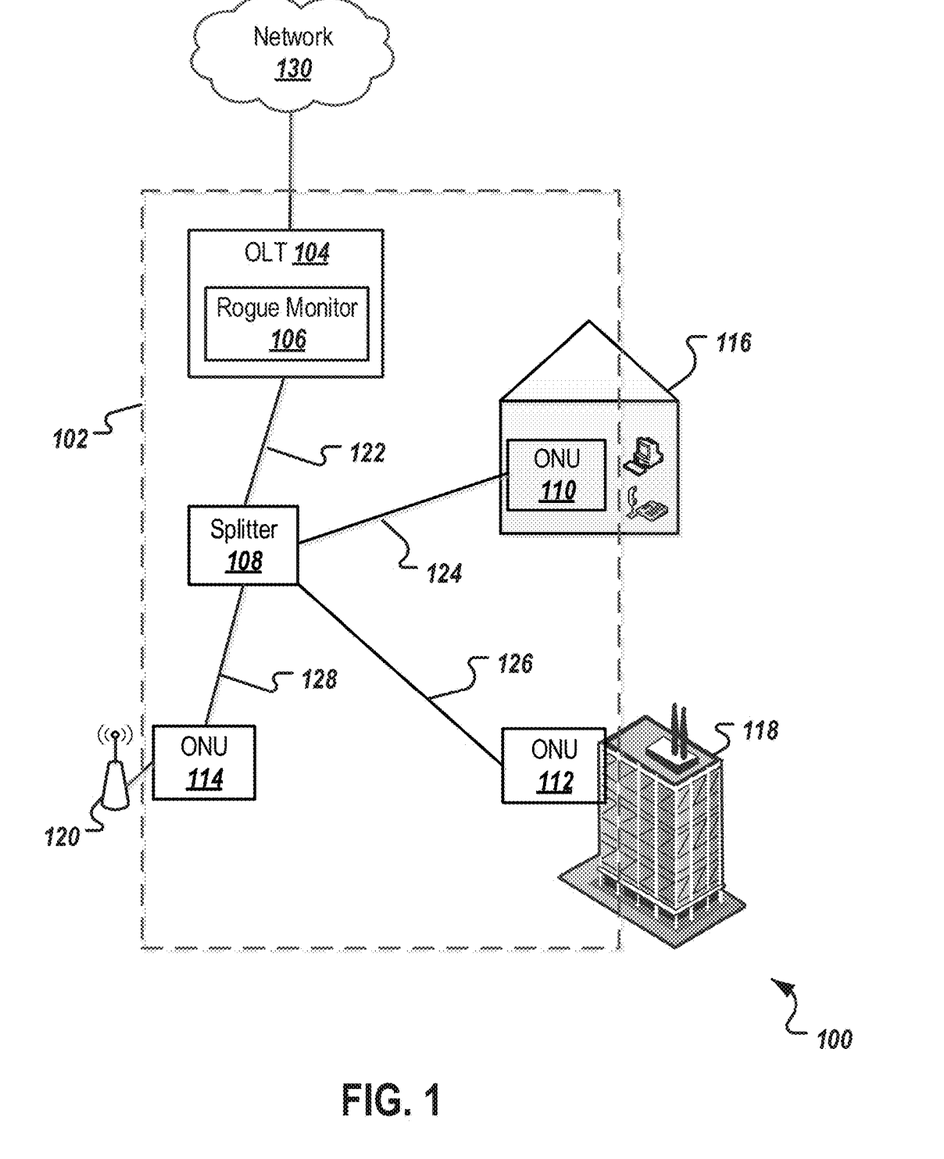
FIG. 1 is a block diagram illustrating an example optical networking environment for automatically identifying rogue ONU.

FIG. 1 is a block diagram illustrating an example optical networking environment 100 in which rogue ONU(s) can be detected and/or identified. As illustrated in FIG. 1, the environment 100 includes a passive optical network (PON) 102 that connects users to a network 130. In some implementations, the environment 100 may include additional and/or different components not shown in the block diagram, such as one or more active optical networks (AONs), another type of network that provides network services (e.g., ADSL2+, VDSL2, etc.), or a combination of these and other technologies. In some implementations, components may also be omitted from the environment 100.

The network 130 facilitates wireless or wireline communications between the components of the PON 102 with any other local or remote computer, such as additional PONs, servers, or other devices communicably coupled to the network 130, including those not illustrated in FIG. 1. As illustrated in FIG. 1, the network 130 is depicted as a single network, but may be a combination of more than one network without departing from the scope of this disclosure.

In some implementations, one or more of the illustrated components may be included within network 130 as one or more cloud-based services or operations. The network 130 may be all or a portion of an enterprise or secured network, while in another case, at least a portion of the network 130 may represent a connection to the Internet, a public switched telephone network (PSTN), a data server, a video server, or additional or different networks. In some implementations, a portion of the network 130 may be a virtual private network (VPN). Further, all or a portion of the network 130 can comprise either a wireline or wireless link. Example wireless links may include 802.11ac/ad/af/a/b/g/n, 802.20, WiMax, LTE, and/or any other appropriate wireless links. In other words, the network 130 encompasses any internal or external network, networks, sub-network, or combination thereof, operable to facilitate communications between various computing components, inside and outside the environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

As illustrated, the PON 102 includes an OLT 104 at a service provider's central office (or other distribution point), a splitter 108, an ONU 110 near residential locations 116, an ONU 112 near business locations 118, an ONU 114 near wireless communications equipment 120, a fiber optic link 122 connecting the OLT 104 and the splitter 108, a fiber optic link 124 connecting the ONU 110 and the splitter 108, a fiber optic link 126 connecting the ONU 112 and the splitter 108, and a fiber optic link 128 connecting the ONU 114 and the splitter 108. Using a splitter 108, the OLT 104 is coupled to a number of ONUs 110, 112, and 114 (also referred to as optical network terminals (ONTs)), which are located near end users, thereby forming a point-to-multipoint network. For example, in the case of Gigabit Passive Optical Network (GPON), a single OLT port can connect to 64 (or another number of) different ONUs through the splitter 108. To serve multiple customers on the same network, the GPON uses logical multiplexing in a downstream direction and time-division multiplexing in an upstream direction.

Each ONU can include, or otherwise be coupled to, one or more customer-premises equipment (CPE) or subscriber devices (e.g., CPE modems). For example, the ONU 110 is a device that terminates the PON 102 at the customer end, and provides a service connection to a user living in the residential locations 116. The ONU 110 terminates optical fiber transmission, and can transform incoming optical signals into electrical signals, adapted for processing by subscriber devices. As a result, ONUs can provide network services, for example, to residential locations 116, business locations 118, or other forms of communications infrastructure, such as wireless communications equipment 120.

The OLT 104, as a network distribution element, provides an interface between the PON 102 and the network 130. The OLT 104 transmits downstream data traffic to the ONUs (e.g., ONUs 110, 112, and 114), and receives upstream data traffic from the ONUs.

As illustrated, the OLT 104 includes a rogue monitor 106 that can detect and identify a rogue ONU on the PON 102. The rogue monitor 106 can measure communication parameters on the fiber optic link 122 (or acquire the communication parameters provided by the OLT 104 or other component on the PON 102), and apply a rogue detection and identification (RDI) process (discussed in more detail in FIG. 2 below) using the communication parameters. For example, the rogue monitor 106 can cooperate with a receiver of the OLT 104 (e.g., a photo-detector of the receiver) to measure an average optical power, $P_D$, (referred to as "dark power") on the fiber optic link 122, in an upstream direction. The dark power, $P_D$, is measured outside of assigned transmission windows (e.g., assigned timeslots) of the ONUs 110, 112, and 114 on the PON 102. As a result, the dark power, $P_D$, can capture unintentionally injected signal power by a rogue ONU if there is a rogue ONU on the PON 102.

In addition, for a given ONU (e.g., $ONU_n$, n∈[1,N], where N is the number of ONUs on the PON) on the PON 102, the rogue monitor 106 can measure or acquire an optical power of high signals, $P_{T,1,n}$, (e.g., an optical power of logical 1s) and an optical power of low signals, $P_{T,0,n}$, (e.g., an optical power of logical 0s) received over the fiber optic link 122 during a timeslot assigned to the given ONU. In some implementations, $P_{T,1,n}$ and $P_{T,0,n}$ can be calculated (discussed in more detail in FIG. 2 below). With the determined $P_D$, $P_{T,1,n}$, and $P_{T,0,n}$, the rogue monitor 106 can calculate a modified optical power of high signals, $P_{1,n}=P_{T,1,n}-P_D$, and a modified optical power of low signals, $P_{0,n}=P_{T,0,n}-P_D$, for the given ONU. With the calculated $P_{1,n}$ and $P_{0,n}$, the rogue monitor 106 can calculate an extinction ratio, $ER_{calc,n}=P_{1,n}/P_{0,n}$, for the given ONU. With the calculated $ER_{calc,n}$, the rogue monitor 106 can determine whether the given ONU is a rogue ONU based on a comparison between the calculated $ER_{calc,n}$ and an acceptable range of ER values. For example, if the calculated $ER_{calc,n}$ is outside of the acceptable range of ER values, the rogue monitor 106 can identify the given ONU (e.g., $ONU_n$) as a rogue ONU.

Figure 2:
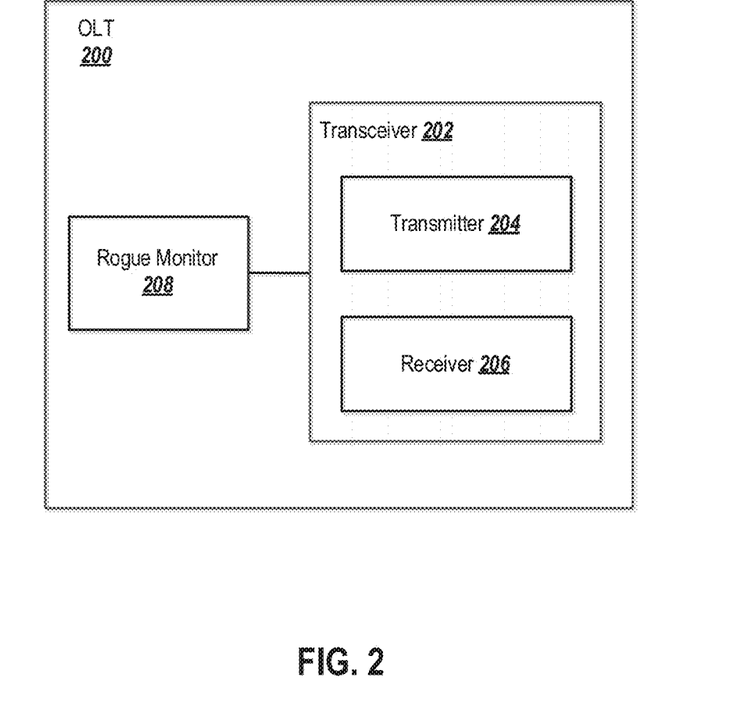
FIG. 2 is a block diagram of an example OLT.

FIG. 2 is a block diagram of an example OLT 200. In some implementations, the OLT 200 may include additional and/or different components not shown in the block diagram. Components may also be omitted from the OLT transmitter 200. The components illustrated in FIG. 2 may be similar to or different from those described in FIG. 1.

As illustrated in FIG. 2, the OLT 200 includes a transceiver 202. The transceiver 202 can be configured to transmit and/or receive data streams from ONUs over a fiber optic link (e.g., the fiber optic link 122). The transceiver 202 includes a transmitter 204 and a receiver 206. In some implementations, the transmitter 204 can transmit data streams to ONUs using logical multiplexing in a downstream direction. The receiver 206 can receive data streams from ONUs using time-division multiplexing in an upstream direction.

As illustrated, the OLT 200 includes a rogue monitor 208. The rogue monitor 208 can be configured to execute a rogue detection and identification (RDI) process, and hence to identify rogue ONU(s) on a PON (or a GPON). To implement the RDI process (discussed in more detail below), the rogue monitor 208 can measure or have access to communication parameters such as those listed in Table 1 below.

TABLE 1

| Parameter | Description |
|---|---|
| $P_D$ | "Dark Power" the average optical power measured at the OLT receiver outside of all timeslots assigned to ONUs (i.e. when all ONUs should be quiet and no ONU should be transmitting). |
| $A_{T,n} = P_{T,1,n} - P_{T,0,n}$ | The power difference between the power of the 1s level and the power of the 0s level for the $n^{th}$ ONU on the PON, measured at the OLT Receiver while the $n^{th}$ ONU is transmitting during its assigned timeslot. Obtained with an AC-coupled RSSI measurement or by having the $n^{th}$ ONU transmitting all 1s and then all 0s to measure $P_{T,1,n}$ and $P_{T,0,n}$ separately. n = 1, 2, . . . , N , where N is the number of ONUs on the PON. |

TABLE 1-continued

| Parameter | Description |
|---|---|
| $D_{1,n}$ | The 1s density of the signal from the $n^{th}$ ONU on the PON measured at the OLT Receiver. Calculated by counting the 1 bits in the received data stream at the OLT while the $n^{th}$ ONU is transmitting during its assigned timeslot and dividing by the total number of received bits from the $n^{th}$ ONU during the same timeslot. n = 1, 2, . . . , N. |
| $D_{0,n}$ | The 0s density of the signal from the $n^{th}$ ONU on the PON measured at the OLT Receiver. Calculated either by counting the 0 bits in the received data stream at the OLT while the $n^{th}$ ONU is transmitting during its assigned timeslot and dividing by the total number of received bits from the $n^{th}$ ONU during the same timeslot, or by $D_{0,n} = 1 - D_{1,n}$. n = 1, 2, . . . , N. |
| $P_{T,n}$ | The average power of the aggregate optical signal measured at the OLT receiver during the $n^{th}$ ONU's timeslot. Obtained with a DC-coupled RSSI measurement. n = 1, 2, . . . , N. |

The RDI process is based on two assumptions:
(1) All ONUs on the PON, which are operating as intended, transmit signals with extinction ratio (ER) compliant with the ITU-T GPON specification (e.g., 10 $\log_{10}$ (ER)>10 dB).
(2) When a rogue ONU is on the PON, $P_{T,n}=P_n+P_D$ for all normal ONUs while $P_{T,n}=P_R$ for the rogue ONU. $P_n$ is the average optical power of the $n^{th}$ ONU under normal operating conditions (e.g., no rogue ONU present on the PON). $P_R$ is the average optical power of the $n^{th}$ ONU when the $n^{th}$ ONU is the rogue ONU.

In some implementations, the RDI process has 4 basic steps:

Step 1: Measure or calculate $P_{T,1,n}$ and $P_{T,0,n}$, the 1's level power and the 0's level power of the aggregate signal at OLT receiver while the $n^{th}$ ONU is transmitting during its assigned timeslot, respectively.[1] n=1, 2, . . . , N, where N is the number of ONUs on the PON. $P_{T,1,n}$ and $P_{T,0,n}$ can be calculated using $$P_{T,1,n}=P_{T,n}+A_{T,n}D_{0,n} \quad (1)$$

and $$P_{T,0,n}=P_{T,n}-A_{T,n}D_{1,n} \quad (2)$$

[1] See the Appendix for an example derivation of equations (1) and (2).

Step 2: Calculate $P_{1,n}$ and $P_{0,n}$, the modified 1s level power and the modified 0s level power for the $n^{th}$ ONU on the PON, respectively.

$$P_{1,n}=P_{T,1,n}-P_D \quad (3)$$

and $$P_{0,n}=P_{T,0,n}-P_D \quad (4)$$

Step 3: Calculate an extinction ratio of the $n^{th}$ ONU, $ER_{calc,n}$, based on the calculated values of $P_{1,n}$ and $P_{0,n}$.

$$ER_{calc,n} = \frac{P_{1,n}}{P_{0,n}} \quad (5)$$

Step 4: Compare $ER_{calc,n}$ to acceptable ER values under normal operating conditions (e.g., no rogue ONU present on the PON). For example, the acceptable ER values can approximate, $ER_{ITU-T}$, the ONU extinction ratio specified in the ITU-T G.984 series of GPON standards. ONUs with reasonable $ER_{calc,n}$ values (e.g., within a reasonable range of ER values between $ER_{max}$ and $ER_{min}$) are good (non-rogue) ONUs. An ONU with $ER_{calc,n}$ value outside the reasonable range of ER values is a rogue ONU.

$$\begin{cases} ONU_n \text{ is good} & ER_{min} < ER_{calc,n} < ER_{max} \\ ONU_n \text{ is rogue} & \text{Otherwise} \end{cases} \quad (6)$$

As discussed above, a rogue ONU can be identified based on its calculated ER value. If the dark power on the PON, $P_D$, is assumed to be independent and separate from signals, $P_n$, received at the OLT from normal ONUs on the PON, for the normal ONUs, $P_D$ is added to $P_n$ at the OLT photodetector to produce the aggregate received signals, $P_{T,n}$.

$$P_{T,n} = P_n + P_D \quad (7)$$

$$P_{T,1,n} = P_{1,n} + P_D \quad (8)$$

$$P_{T,0,n} = P_{0,n} + P_D \quad (9)$$

On the other hand, for a rogue ONU, $P_D$ is not independent or separate from the rogue ONU's signal at the OLT receiver. Rather, $P_D$ is an integral component of the rogue ONU's signal that cannot be easily separated from other signal components of the rogue ONU's signal. Therefore, for the rogue ONU, $$P_{T,n} = P_R \quad (10)$$

$$P_{T,1,n} = P_{R,1} \quad (11)$$

$$P_{T,0,n} = P_{R,0} \quad (12)$$

The RDI process exploits this difference in the composition of the normal and rogue ONU signals to identify the rogue ONU. Specifically, observe from Eqs. (3), (4), and (5), that $$ER_{calc,n} = \frac{P_{T,1,n} - P_D}{P_{T,0,n} - P_D}. \quad (13)$$

Using Eq. (8) and Eq. (9) for normal ONUs, Eq. (13) becomes $$ER_{calc,n} = \frac{P_{1,n} + P_D - P_D}{P_{0,n} + P_D - P_D} = \frac{P_{1,n}}{P_{0,n}} \to ER_{ITU-T}. \quad (14)$$

However, using Eq. (11) and Eq. (12) for a rogue ONU, Eq. (13) becomes $$ER_{calc,n} = ER_{calc,R} = \frac{P_{R,1} - P_D}{P_{R,0} - P_D}. \quad (15)$$

According to Eq. (15), $ER_{calc,R}$ can take on a variety of values depending on the relative values of $P_{R,1}$, $P_{R,0}$ and $P_D$. For example, Case 1: When the output power of the rogue ONU outside of its timeslot is between the 1s level and the 0s level of the rogue ONU's signal during its allocated timeslot, the calculated extinction ratio of the rogue ONU will be negative.

If $P_{R,0} < P_D < P_{R,1}$, then $ER_{calc,R} < 0$. (16)

Case 2: When the output power of the rogue ONU outside of its timeslot is slightly less than the 0s level of the rogue ONU's signal during its allocated timeslot, the calculated extinction ratio of the rogue ONU will be quite large.

If $P_D < P_{R,0}$ and $P_D \to P_{R,0}$, then $ER_{calc,R} \to \infty$ (17)

Case 1 and Case 2 provide strong indication of a rogue ONU.

In some implementations, the rogue monitor 208 can have access to those communication parameters listed in Table 1 (e.g., acquired from the OLT 200 or other component on the PON), and perform steps 1-4 of the RDI process for each ONU on the PON to identify rogue ONU(s). In some implementations, the rogue monitor 208 can measure the communication parameters listed in Table 1 (e.g., cooperate with the receiver 206 to perform measurement on the fiber optic link), and perform some or all of the steps 1-4 of the RDI process for each ONU on the PON to identify any rogue ONU(s) that might be on the PON. For example, the rogue monitor 208 can cooperate with the transmitter 204 to send instructions to each ONU. The instructions can cause each ONU to transmit all 1s for a period of time, and then transmit all 0s for a period of time to measure $P_{T,1,n}$ and $P_{T,0,n}$ separately. The ONU can then perform steps 2-4 of the RDI process for each ONU on the PON to identify any rogue ONU(s).

The rogue monitor 208 can measure $A_{T,n}$ with an AC-coupled RSSI measurement. The rogue monitor 208 can measure $P_{T,n}$ with a DC-coupled RSSI measurement. In some implementations, the rogue monitor 208 can measure $D_{1,n}$ and $D_{0,n}$ by first counting the 1 bits and the 0 bits in the $n^{th}$ ONU's received data, and then dividing the counted 1 and 0 bits' numbers by the total number of bits received from the $n^{th}$ ONU during that timeslot, respectively. In some implementations, the rogue monitor 208 can determine $D_{1,n}$ and $D_{0,n}$ by having the $n^{th}$ ONU transmit a known bit pattern (e.g., the received known bit pattern having known $D_{1,n}$ and $D_{0,n}$ to the rogue monitor 208). In some implementations, the rogue monitor 208 can have access to some communication parameters listed in Table 1, measure other communication parameters listed in Table 1, and perform steps 1-4 of the RDI process for each ONU on the PON to identify rogue ONU(s).

In some implementations, the operations performed by the rogue monitor 208 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The rogue monitor 208 can also be implemented as special purpose logic circuitry, for example, an FPGA or an application specific integrated circuit (ASIC).

Figure 3:
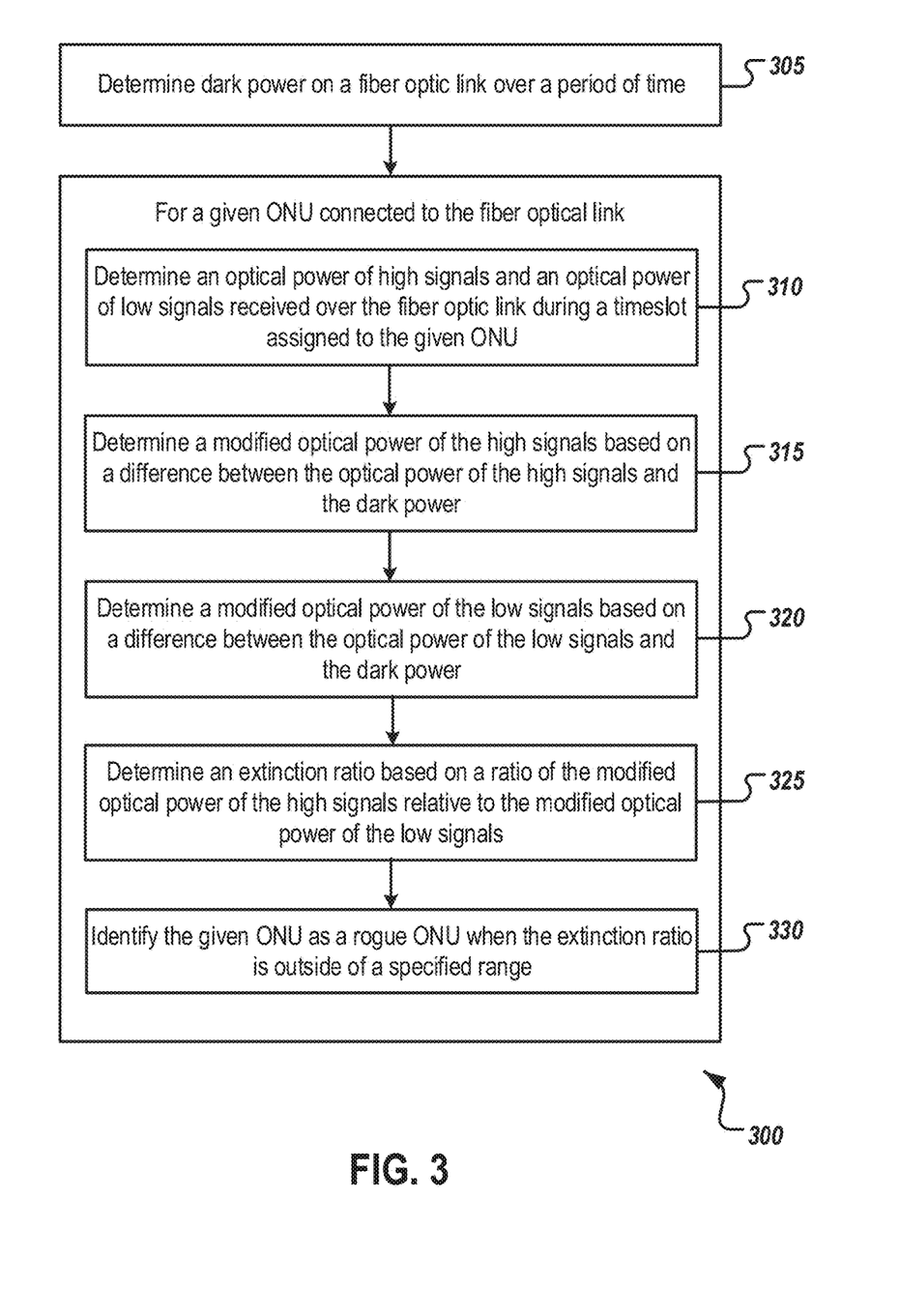
FIG. 3 is a flow chart of an example process for automatically identifying rogue ONU.

FIG. 3 is a flow chart of an example process 300 for automatically identifying a rogue ONU. The example process 300 can be performed, for example, by one or more telecommunications devices, such as those described with reference to FIGS. 1 and 2. The example process 300 can also be implemented as instructions stored on a non-transitory, computer-readable medium that, when executed by one or more telecommunications devices, configures the one or more telecommunications devices to perform and/or cause the one or more telecommunications devices to perform the actions of the example process 300.

In some implementations, an average optical power (e.g., "dark power") is determined on a fiber optic link over a period of time outside of all timeslots assigned to ONUs, when all ONUs should be quiet and no ONU should be transmitting (305 (e.g., $P_D$)). In some implementations, the ONUs are not required to shut their lasers off completely. To facilitate rapid turn on in preparation for data transmission, the ONUs may be allowed to emit very low levels of light, for example less than −45 dBm, and still be considered to be "quiet and not transmitting."

For a given ONU connected to the fiber optic link, the following operations are performed. An optical power of high signals and an optical power of low signals received over the fiber optic link during a timeslot assigned to the given ONU are determined (310 (e.g., $P_{T,1,n}$ and $P_{T,0,n}$)). In some implementations, high signals are logical 1s and low signals are logical 0s. In some implementations, the optical power of the high signals is determined by measuring the optical power on the fiber optic link while the given ONU is transmitting all high signals during the timeslot. The optical power of the low signals can be determined by measuring the optical power on the fiber optic link while the given ONU is transmitting all low signals during the timeslot. In some implementations, the optical power of the high signals and the optical power of the low signals are calculated based on other measured communication parameters (discussed in more detail in FIG. 4 below).

A modified optical power of the high signals is determined based on a difference between the optical power of the high signals and the dark power (315 (e.g., $P_{1,n} = P_{T,1,n} − P_D$)). A modified optical power of the low signals is determined based on a difference between the optical power of the low signals and the dark power (320 (e.g., $P_{0,n} = P_{T,0,n} − P_D$)).

An extinction ratio for the given ONU is determined based on a ratio of the modified optical power of the high signals relative to the modified optical power of the low signals $$\left(325\left(e.g., ER_{calc,n} = \frac{P_{1,n}}{P_{0,n}}\right)\right).$$

The given ONU is identified as a rogue ONU when the extinction ratio is outside of a specified range (330). In some implementations, determining the optical power of the high signals and the optical power of the low signals, determining the modified optical power of the high signals, determining the modified optical power of the low signals, determining the extinction ratio, and identifying the given ONU as the rogue ONU are performed automatically by an optical line terminal (OLT) connected to the fiber optic link. In some implementations, the OLT includes a rogue monitor, which includes one or more processes that perform operations in the example process 300. The one or more processes can be implemented in a dedicated hardware state machine, computer processor, and/or FPGA. In some implementations, the OLT and the given ONU are on a Gigabit Passive Optical Network (GPON).

The example process 300 shown in FIG. 3 can be modified or reconfigured to include additional, fewer, or different actions (not shown in FIG. 3), which can be performed in the order shown or in a different order. For example, after 325, the given ONU is identified as a non-rogue ONU (e.g., a normal ONU) when the extinction ratio is within the specified range. In some implementations, one or more of the actions can be repeated or iterated, for example, until a terminating condition is reached. In some implementations, one or more of the individual actions shown in FIG. 3 can be executed as multiple separate actions, or one or more subsets of the actions shown in FIG. 3 can be combined and executed as a single action.

Figure 4:
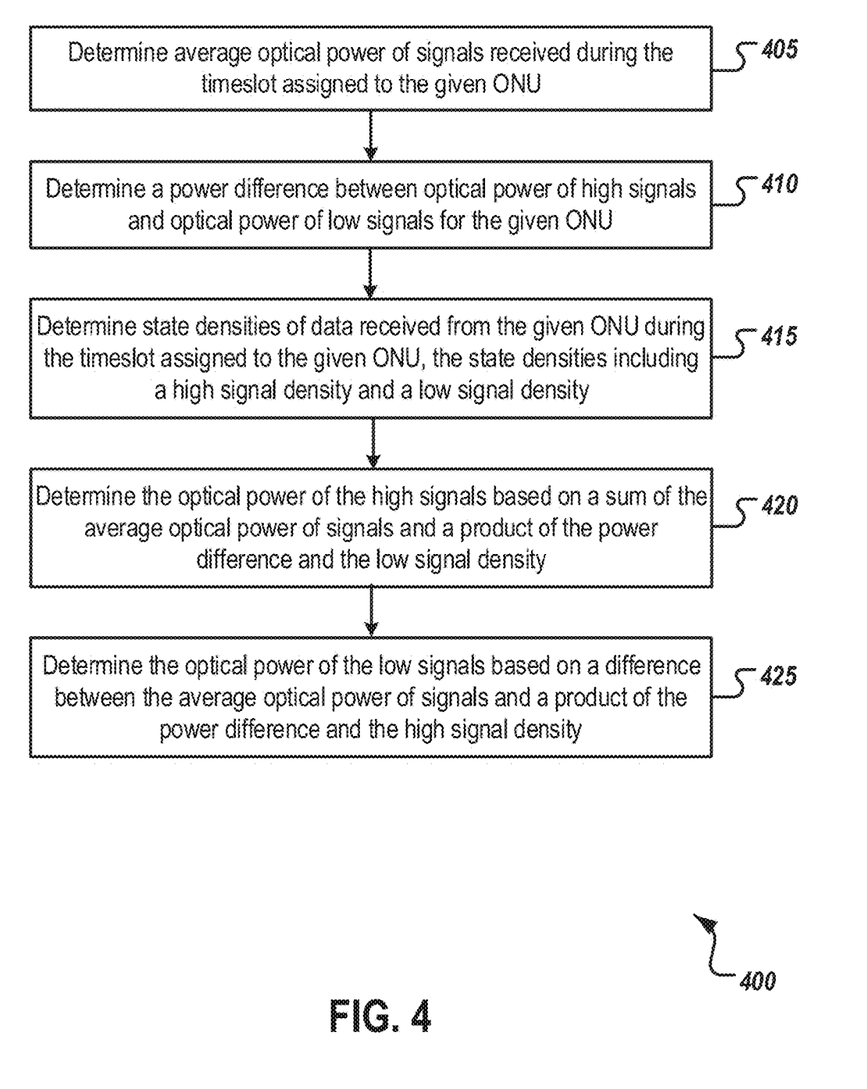
FIG. 4 is a flow chart of an example process for calculating an optical power of high signals and an optical power of low signals.

FIG. 4 is a flow chart of an example process 400 for calculating an optical power of high signals and an optical power of low signals. The example process 400 can be performed, for example, by one or more telecommunications devices such as those described with reference to FIGS. 1 and 2. The example process 400 can also be implemented as instructions stored on a non-transitory, computer-readable medium that, when executed by one or more telecommunications devices, configures the one or more telecommunications devices to perform and/or cause the one or more telecommunications devices to perform the actions of the example process 400. In some implementations, the example process 400 can be implemented when the optical power of high signals and the optical power of low signals (e.g., $P_{T,1,n}$ and $P_{T,0,n}$ described in 310 above in FIG. 3) are not measured directly.

Average optical power of signals received during the timeslot assigned to the given ONU is determined (405 (e.g. $P_{T,n}$)). In some implementations, the average optical power of signals is determined based on a DC-coupled Received Signal Strength Indicator (RSSI) measurement.

A power difference between optical power of high signals and optical power of low signals for the given ONU is determined (410). In some implementations, the power difference is determined based on an AC-coupled Received Signal Strength Indicator (RSSI) measurement.

State densities of data received from the given ONU during the timeslot assigned to the given ONU are determined (415). The state densities include a high signal density and a low signal density. In some implementations, the high signal density is logic 1s density, and the low signal density is logic 0s density in the received data stream. The high signal density and the low signal density are determined by counting the 1 bits and the 0 bits in the given ONU's received data and dividing by the total number of received bits, respectively. In some implementations, the high signal density and the low signal density are known while the given ONU is transmitting a known data pattern.

The optical power of the high signals is determined based on a sum of the average optical power of signals and a product of the power difference and the low signal density (420 (e.g., $P_{T,1,n} = P_{T,n} + A_{T,n} D_{0,n}$)). The optical power of the low signals is determined based on a difference between the average optical power of signals and a product of the power difference and the high signal density (425 (e.g., $P_{T,0,n} = P_{T,n} − A_{T,n} D_{1,n}$)).

The example process 400 shown in FIG. 4 can be modified or reconfigured to include additional, fewer, or different actions (not shown in FIG. 4), which can be performed in the order shown or in a different order. In some implementations, one or more of the actions can be repeated or iterated, for example, until a terminating condition is reached. In some implementations, one or more of the individual actions shown in FIG. 4 can be executed as multiple separate actions, or one or more subsets of the actions shown in FIG. 4 can be combined and executed as a single action.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can in some cases be excised from the combination, and the claimed combination may be directed to a subcombination, or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

APPENDIX

An example derivation of Eq. (1) and Eq. (2):

Average received power, $P_{T,n}$, can be defined in terms of $D_{1,n}$ and $D_{0,n}$, the 1's density and 0's density, respectively, of a bit stream. $D_{1,n}$ and $D_{0,n}$ are defined as $$D_{1,n} = \frac{x}{x+y} \quad (18)$$

$$D_{0,n} = \frac{y}{x+y} \quad (19)$$

where x is the number of 1 bits and y is the number of 0 bits. $P_{T,n}$ is the weighted average of $P_{T,1,n}$ and $P_{T,0,n}$ $$P_{T,n} = \frac{xP_{T,1,n} + yP_{T,0,n}}{x+y}. \quad (20)$$

Solving for $P_{T,1,n}$ and $P_{T,0,n}$ in (20) gives $$P_{T,1,n} = \frac{(x+y)P_{T,n} - yP_{T,0,n}}{x}, \quad (21)$$

and, $$P_{T,0,n} = \frac{(x+y)P_{T,n} - xP_{T,1,n}}{y}. \quad (22)$$

Recall that $A_{T,n}$ is defined as $$A_{T,n} = P_{T,1,n} - P_{T,0,n} \quad (23)$$

Substituting (21) and (22) into (23) and solving for $P_{T,1,n}$ and $P_{T,0,n}$ using (18) and (19) gives $$P_{T,1,n} = P_{T,n} + A_{T,n}D_{0,n} \quad (24)$$

and, $$P_{T,0,n} = P_{T,n} - A_{T,n}D_{1,n} \quad (25)$$

What is claimed is:

1. A system, comprising:
   a plurality of optical network units (ONUs) connected to a fiber optic link; and
   an optical line terminal (OLT) connected to the fiber optic link, wherein the OLT comprises a rogue monitor, including one or more processes that:
   determine dark power on the fiber optic link over a period of time; and
   for a given ONU among the plurality of ONUs:
   determine an optical power of high signals and an optical power of low signals received over the fiber optic link during a timeslot assigned to the given ONU;
   determine a modified optical power of the high signals based on a difference between the optical power of the high signals and the dark power;
   determine a modified optical power of the low signals based on a difference between the optical power of the low signals and the dark power;
   determine an extinction ratio based on a ratio of the modified optical power of the high signals relative to the modified optical power of the low signals; and
   identify the given ONU as a rogue ONU when the extinction ratio is outside of a specified range.

2. The system of claim 1, wherein the optical power of the high signals is determined by measuring on the fiber optic link while the given ONU is transmitting all high signals during the timeslot, and the optical power of the low signals is determined by measuring on the fiber optic link while the given ONU is transmitting all low signals during the timeslot.

3. The system of claim 1, wherein the one or more processes further:
   determine average optical power of signals received during the timeslot assigned to the given ONU;
   determine a power difference between optical power of high signals and optical power of low signals for the given ONU;
   determine state densities of data received from the given ONU during the timeslot assigned to the given ONU, wherein the state densities include a high signal density and a low signal density;
   determine the optical power of the high signals based on a sum of the average optical power of signals and a product of the power difference and the low signal density; and
   determine the optical power of the low signals based on a difference between the average optical power of signals and a product of the power difference and the high signal density.

4. The system of claim 3, wherein the power difference is determined based on an AC-coupled Received Signal Strength Indicator (RSSI) measurement, and the average optical power of signals is determined based on a DC-coupled RSSI measurement.

5. The system of claim 1, wherein determining the optical power of the high signals and the optical power of the low signals, determining the modified optical power of the high signals, determining the modified optical power of the low signals, determining the extinction ratio, and identifying the given ONU as the rogue ONU are performed automatically by the OLT.

6. The system of claim 1, wherein the OLT and the given ONU are on a Gigabit Passive Optical Network (GPON).

7. The system of claim 1, wherein the one or more processes further identify the given ONU as a non-rogue ONU when the extinction ratio is within the specified range.

8. A telecommunications device comprising:
a transceiver configured to communicate over a fiber optic link; and
a rogue monitor, including one or more processes that:
determine dark power on the fiber optic link over a period of time; and
for a given optical network unit (ONU) connected to the fiber optic link:
determine an optical power of high signals and an optical power of low signals received over the fiber optic link during a timeslot assigned to the given ONU;
determine a modified optical power of the high signals based on a difference between the optical power of the high signals and the dark power;
determine a modified optical power of the low signals based on a difference between the optical power of the low signals and the dark power;
determine an extinction ratio based on a ratio of the modified optical power of the high signals relative to the modified optical power of the low signals; and
identify the given ONU as a rogue ONU when the extinction ratio is outside of a specified range.

9. The device of claim 8, wherein the optical power of the high signals is determined by measuring on the fiber optic link while the given ONU is transmitting all high signals during the timeslot, and the optical power of the low signals is determined by measuring on the fiber optic link while the given ONU is transmitting all low signals during the timeslot.

10. The device of claim 8, wherein the one or more processes further:
determine average optical power of signals received during the timeslot assigned to the given ONU;
determine a power difference between optical power of high signals and optical power of low signals for the given ONU;
determine state densities of data received from the given ONU during the timeslot assigned to the given ONU, wherein the state densities include a high signal density and a low signal density;
determine the optical power of the high signals based on a sum of the average optical power of signals and a product of the power difference and the low signal density; and
determine the optical power of the low signals based on a difference between the average optical power of signals and a product of the power difference and the high signal density.

11. The device of claim 10, wherein the power difference is determined based on an AC-coupled Received Signal Strength Indicator (RSSI) measurement, and the average optical power of signals is determined based on a DC-coupled RSSI measurement.

12. The device of claim 8, wherein determining the optical power of the high signals and the optical power of the low signals, determining the modified optical power of the high signals, determining the modified optical power of the low signals, determining the extinction ratio, and identifying the given ONU as the rogue ONU are performed automatically by the telecommunications device.

13. The device of claim 8, wherein the telecommunications device is an optical line terminal (OLT), and the OLT and the given ONU are on a Gigabit Passive Optical Network (GPON).

14. The device of claim 8, wherein the one or more processes further identify the given ONU as a non-rogue ONU when the extinction ratio is within the specified range.

15. A method, comprising:
determining dark power on a fiber optic link over a period of time; and
for a given optical network unit (ONU) connected to the fiber optic link:
determining an optical power of high signals and an optical power of low signals received over the fiber optic link during a timeslot assigned to the given ONU;
determining a modified optical power of the high signals based on a difference between the optical power of the high signals and the dark power;
determining a modified optical power of the low signals based on a difference between the optical power of the low signals and the dark power;
determining an extinction ratio based on a ratio of the modified optical power of the high signals relative to the modified optical power of the low signals; and
identifying the given ONU as a rogue ONU when the extinction ratio is outside of a specified range.

16. The method of claim 15, wherein the optical power of the high signals is determined by measuring on the fiber optic link while the given ONU is transmitting all high signals during the timeslot, and the optical power of the low signals is determined by measuring on the fiber optic link while the given ONU is transmitting all low signals during the timeslot.

17. The method of claim 15, for the given ONU the method further comprising:
determining average optical power of signals received during the timeslot assigned to the given ONU;
determining a power difference between optical power of high signals and optical power of low signals for the given ONU;
determining state densities of data received from the given ONU during the timeslot assigned to the given ONU, wherein the state densities include a high signal density and a low signal density;
determining the optical power of the high signals based on a sum of the average optical power of signals and a product of the power difference and the low signal density; and
determining the optical power of the low signals based on a difference between the average optical power of signals and a product of the power difference and the high signal density.

18. The method of claim 17, wherein the power difference is determined based on an AC-coupled Received Signal Strength Indicator (RSSI) measurement, and the average optical power of signals is determined based on a DC-coupled RSSI measurement.

19. The method of claim 15, wherein determining the optical power of the high signals and the optical power of the low signals, determining the modified optical power of the high signals, determining the modified optical power of the low signals, determining the extinction ratio, and identifying the given ONU as the rogue ONU are performed automatically by an optical line terminal (OLT) connected to the fiber optic link.

20. The method of claim 19, wherein the OLT and the given ONU are on a Gigabit Passive Optical Network (GPON).

21. The method of claim 15, for the given ONU the method further comprising identifying the given ONU as a non-rogue ONU when the extinction ratio is within the specified range.

* * * * *